July 28, 1964  P. ROBINSON  3,142,814
TITANATE ESTER RESISTOR
Filed Aug. 10, 1961
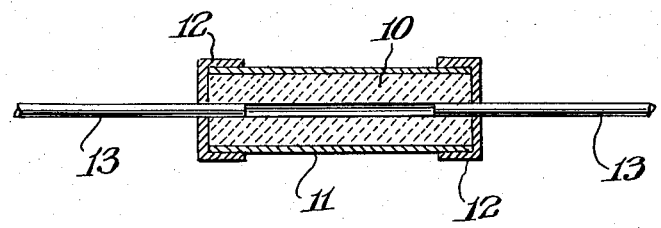
INVENTOR:
Preston Robinson
BY Connolly and Hutz
ATTORNEYS 3,142,814
TITANATE ESTER RESISTOR
Preston Robinson, Williamstown, Mass., assignor to Sprague Electric Company, North Adams, Mass., a corporation of Massachusetts
Filed Aug. 10, 1961, Ser. No. 130,522
5 Claims. (Cl. 338—308)

The present invention relates primarily to advantageous novel compositions which can be formed into a new and improved electrical resistor construction.

It is an object of the present invention to produce films of essentially insulating or resistance character which by virtue of their superior properties, can be employed in a variety of applications, such as, for example, wire coating, in resistors, and in other locales. Further objects of the present invention, as well as the advantages of it, will be apparent from the following description, as well as the appended claims.

In the accompanying drawing, the figure represents a resistor containing resistance particles and a filler material as well as a titanium ester which may be partially hydrolyzed or decomposed.

The present inventive concept is predicated upon the discovery that organic esters of titanium can be used in the production of resistance and semi-conducting layers or bodies in spite of the well-known tendency of these compounds to hydrolyze when subjected to water or water vapor.

The titanate esters such as are used with the present invention, have been known for a number of years, but have never been considered practical for any commercial application because of their sensitivity as indicated above. In general, the methods of forming these compounds are given in such publications as British Patent No. 479,470. The following orthotitanic acid tetra esters are particularly advantageous for many applications:

Dibutyl dihexadecyl titanate
Diamyl ditridecyl titanate
Dioctyl diheptadecyl titanate
Diheptyl ditetradecyl titanate
Dihexyl didodecyl titanate
Di-isobutyl dinondecyl titanate
Dioctyl dieicosyl titanate
Dihexyl dihexadecyl titanate It will be seen that all of the above esters contain from three to six carbon atoms in one of the ester groups and from 12 to 20 carbon atoms in the other ester group. Those compounds falling within these limits are particularly advantageous with the present invention.

The sensitivity of titanium esters to hydrolysis can in many instances be overcome by blending such compounds with a small amount, say 1 to 10%, of an organic isocyanate which preferably contains more than one reactive group on the molecule so as to promote a reaction between these ingredients. These mixtures of isocyanates and of esters of titanium are much more insensitive to moisture and other deteriorating conditions than the titanate esters alone. In general, whenever the term "titanate ester" is used in this specification, it will be understood that isocyanate modified materials as indicated in this paragraph can be used.

When it is desired to produce a dielectric film on a surface in accordance with the present invention, titanate esters of the indicated variety may be pointed, sprayed, or flowed on the surface or applied by dipping, or electrolytic attraction from a non-aqueous bath, or other means known to the art. When in position, they are either completely hydrolyzed, with water, steam, or thermally decomposed, using either conduction heating means or infra-red or other types of radiant or dielectric heating or partly hydrolyzed or decomposed or polymerized by the same means. Normally temperatures of 150° C. or higher are used for these purposes. For most applications, it is desired that the titanate esters be filled with a finely ground inorganic material, such as, for example, talc, bentonite, silica, ground mica, or the like. In general, these ingredients may be used in proportion of from 0 to 75% by weight of the titanate ester or esters employed in any given composition.

In order that mixtures of this variety can be satisfactorily applied, it is frequently necessary to incorporate within them from 1 to 75% of a non-hydrolyzing organic solvent, such as for example, carbontetrachloride, dimethylether, diethylether, carbon disulfide, and others. On many occasions, these mixtures of titanium esters and inorganic particles with or without solvents added can be extended or pressure molded directly into a final desired shape. By this expedient wires can be provided within an inert coating by extruding the titanium ester mass directly upon their surface. It is to be understood from the above that other ingredients besides those specifically named, such as, for example, plasticizers or other organic or inorganic filling materials can be employed in any of the compositions indicated.

The titanate esters can be used in producing resistors capable of operation over a wide temperature range and having extremely good electrical characteristics. Such resistors are capable of production by mixing carbon or other resistance particles, such as, semi-conductance particles in place of or together with the inorganic filler materials and solvents mentioned above. The individual organic titanic acid ester films of this invention when incorporated with a resin may be cast or molded into solid elements. Suitable resins are n-vinyl carbazole, styrene, pentachlorostyrene, phenyl formaldehyde, urea formaldehyde, and silicones. The resulting compositions, if liquid, can be used directly as resistance inks and then can be partially or completely hydrolyzed or decomposed. If of a more solid nature, they can be molded or otherwise formed into various resistance shapes, and then can be either partially or completely hydrolyzed or decomposed as previously indicated.

Generally speaking the printed resistors and printed circuits employing such resistors disclosed herein should be provided with a protected insulating housing known as a covering coat.

In a more restricted sense the invention is concerned with a printed resistor comprising a ceramic base upon which there is deposited an adherent layer of resistance material. It has been found possible to produce printed resistors with excellent electrical characteristics by a simple and efficient manufacturing process utilizing the specific types of compounds set forth herein.

The utility of the titanate esters is not limited to comparatively rigid structures as indicated above. The above discussion has been directed toward the use of relatively solid non-porous base for deposition of the resistor. It has been found a particularly useful resistor can be obtained by coating a semiporous and flexible base. It has been possible to employ bases such as regenerated cellulose, polyethylene terephthalate and others.

Frequently, unexpected resistance properties are obtained by the decomposition or hydrolysis of these titanium esters in a reducing atmosphere, so as to make the titanium dioxide nuclei semi-conducting in nature. Other special effects can be incorporated within various constructions of the invention by including within the titanate esters prior to hydrolyzation or decomposition other materials, such as ferromagnetic ferrites and/or compounds, such as barium titanate which when polarized as indicated above are of a transducing nature. Polarized compositions utilizing such materials as finely divided quartz or barium titanate instead of inert fillers are particularly advantageous for piezoelectric applications when formed in a polarized layer upon a suitable supporting metal film electrode.

This invention is illustrated by reference to the figure which shows a ceramic core 10 having a layer 11 of titanate esters applied to it. The esters making up the layer 11 are either completely hydrolyzed with water or steam or are thermally decomposed by suitable means as indicated above. The layer 11 is suitably provided with means for electrical connection. A lead cap assembly made up of a cap 12 and a lead 13 is mounted on each end of the coated ceramic core, and is in electrical connection with the layer 11. A protective coating may be applied over this combination and the entire unit may be encased in a molded case so that only the lead wires 13 protrude.

Insulating films of organic titanium esters as described can be formed over other inorganic dielectric layers, such as are described in U.S. Patent No. 2,707,703, issued May 3, 1955, to Stanley Dorst on co-pending application Serial No. 767,740, filed August 9, 1947. The solid compositions of the invention are also of particular utility in forming multi-layer dielectric films for electrical capacitors. Those liquid compositions indicated herein are capable of utility with paper and other spacers employed in capacitor manufacture.

For the purpose of illustrating the broad features of the present invention, a number of specific examples are given as follows:

Example 1

A coating of dibutyl dihexadecyl titanate approximately 4 mils thick was applied to an insulator core by brushing. This core was then further treated by being placed 6 inches from a 500 watt infra-red light bulb for a period of 20 minutes. Terminals were attached to the resultant semi-conducting layer to provide a resistor.

Example 2

A composition consisting of 10 parts diamyl ditridecyl titanate and 5 parts ground mica, together with 3 parts butyl alcohol was applied to a non-conducting core by dipping the core within the mixture at 20° C. and withdrawing it rapidly. The so-coated core was then subjected to 15 p.s.i. gauge "exhaust" steam for a period of 45 minutes, and terminal leads attached to provide a resistor.

Example 3

A resistance composition consisting of 10 parts of diisobutyl dinondecyl titanate, 3 parts of carbon black and 4 parts of ground silica was extruded through a quarter inch round orifice using 2000 p.s.i. pressure. Four inch lengths of this composition were then cut and placed in a common laboratory oven at 300° C. for a period of one hour. Following this, leads were placed in contact with the ends of the treated units in accordance with known procedures.

It is to be understood that these examples are not in any manner to be considered of a limiting nature as other conditions, procedures, and reactants can be utilized within the scope of this inventive concept. The present invention is only to be considered as limited by the appended claims. Obviously, other equivalent structures besides those specifically discussed and other equivalent reactants can be employed. For example, it is contemplated that subsequent investigation will show that other esters of Group IV metals besides titanium can be used in the present invention.

This application is a continuation in part of my co-pending application Serial No. 320,819, filed November 15, 1952, now abandoned, for Titanate Ester.

What is claimed is:

1. A resistor comprising an insulating base and an adherent layer of resistance material of a hydrolyzed orthotitanic acid tetra ester, said material containing semi-conducting titanium dioxide and contact areas attached thereto.

2. A resistor comprising an insulating base and an adherent layer of resistance material of a decomposed orthotitanic acid tetra ester, said material containing semi-conducting titanium dioxide, and contact areas attached thereto.

3. A resistor comprising an orthotitanic acid tetra ester, resistance particles and contact areas attached thereto.

4. A resistor comprising a hydrolyzed orthotitanic acid tetra ester, resistance particles and contact areas attached thereto.

5. A resistor comprising a decomposed orthotitanic acid tetra ester, resistance particles and contact areas attached thereto.

References Cited in the file of this patent

UNITED STATES PATENTS

| | | |
|---|---|---|
| 2,686,274 | Rooksby | Aug. 10, 1954 |
| 2,901,381 | Teal | Aug. 25, 1959 |
| 2,917,414 | McLean | Dec. 15, 1959 |
| 2,940,941 | Dalton | June 14, 1960 |
| 2,978,618 | Myers | Apr. 4, 1961 |